(12) United States Patent
Dudda et al.

(10) Patent No.: US 11,553,515 B2
(45) Date of Patent: *Jan. 10, 2023

(54) SEMI-PERSISTENT SCHEDULING IN SUB-SUBFRAME OPERATION

(71) Applicant: Telefonaktiebolaget LM Ericsson (publ), Stockholm (SE)

(72) Inventors: Torsten Dudda, Wassenberg (DE); Malik Wahaj Arshad, Upplands Väsby (SE); Henrik Enbuske, Stockholm (SE); Gustav Wikström, Täby (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 50 days.

This patent is subject to a terminal disclaimer.

(21) Appl. No.: 17/189,808

(22) Filed: Mar. 2, 2021

(65) Prior Publication Data

US 2021/0185717 A1    Jun. 17, 2021

Related U.S. Application Data

(63) Continuation of application No. 16/346,605, filed as application No. PCT/EP2017/078102 on Nov. 2, 2017, now Pat. No. 10,966,235.

(Continued)

(51) Int. Cl.
*H04W 72/04* (2009.01)
*H04W 72/12* (2009.01)
*H04L 1/18* (2006.01)

(52) U.S. Cl.
CPC ....... *H04W 72/1289* (2013.01); *H04L 1/1812* (2013.01); *H04W 72/042* (2013.01); *H04W 72/0446* (2013.01); *H04W 72/12* (2013.01)

(58) Field of Classification Search
CPC .......................... H04W 72/12; H04W 72/0446
(Continued)

(56) References Cited

U.S. PATENT DOCUMENTS 9,867,212 B2    1/2018  Lohr et al.
10,171,219 B2   1/2019  Fan et al.
(Continued)

FOREIGN PATENT DOCUMENTS

RU    2518388 C2    6/2014
RU    2549154 C2    4/2015
(Continued)

OTHER PUBLICATIONS

Ericsson, "New Work Item on Shortened TTI and Processing Time for LTE", 3GPP TSG RAN Meeting #72, Busan, Korea, Jun. 13, 2016, pp. 1-9, RP-161299, 3GPP.
(Continued)

*Primary Examiner* — Angel T Brockman
(74) *Attorney, Agent, or Firm* — Coats + Bennett, PLLC

(57) ABSTRACT

A scheduling node transmits, to a radio node configured for sub-subframe operation, a semi-persistent scheduling (SPS) configuration message configuring the radio node for sub-subframe-based SPS. The SPS configuration message comprises an identifier of the radio node and indicates a pattern of sub-subframes in which a resource allocation for the radio node repeats. The radio node receives the SPS configuration message and configures the radio node for sub-subframe-based SPS according to the SPS configuration message.

23 Claims, 7 Drawing Sheets

Related U.S. Application Data

(60) Provisional application No. 62/417,737, filed on Nov. 4, 2016.

(58) Field of Classification Search
USPC .......................................................... 370/329
See application file for complete search history.

(56) References Cited

U.S. PATENT DOCUMENTS

| | | |
|---|---|---|
| 2012/0147810 A1 | 6/2012 | Wang et al. |
| 2013/0039297 A1 | 2/2013 | Wang |
| 2013/0114573 A1 | 5/2013 | Suzuki |
| 2013/0250924 A1 | 9/2013 | Chen |
| 2015/0223212 A1 | 8/2015 | Der Velde |
| 2015/0365831 A1 | 12/2015 | Ko et al. |
| 2017/0026942 A1 | 1/2017 | Vajapeyam |
| 2018/0041325 A1 | 2/2018 | Lee |
| 2019/0289624 A1* | 9/2019 | Dudda .................. H04L 1/1812 |

FOREIGN PATENT DOCUMENTS

| | | |
|---|---|---|
| WO | 2016142006 A1 | 9/2016 |
| WO | 2017052706 A1 | 3/2017 |
| WO | 2017195166 A1 | 11/2017 |
| WO | 2018083198 A1 | 5/2018 |

OTHER PUBLICATIONS

Asustek, "DL and UL SPS Reconfiguration", 3GPP TSG-RAN WG2 Meeting #77, Dresden, Germany,Feb. 6, 2012, pp. 1-6, R2-120364, 3GPP.

3rd Generation Partnership Project, "3rd Generation Partnership Project; Technical Group Radio Access Network; Evolved Universal Terrestrial Radio Access (E-UTRA); Medium Access Control (MAC) Protocol Specification (Release 9)", Technical Specification, 3GPP TS 36.321 V9.6.0, Mar. 1, 2012, pp. 1-48, 3GPP.

Sharp et al., "Shortened TTI for DL Transmissions", 3GPP TSG RAN WG1 Meeting #85, Nanjing, China, May 23, 2016, pp. 1-4, R1-164999, 3GPP.

Xiaomi Communications, "Discussions on DCI Design Consideration for Shortened TTI SPS Operation", 3GPP TSG RAN WG1 Meeting #86, Gothenburg, Sweden, Aug. 22, 2016, pp. 1-3, R1-167334, 3GPP.

3rd Generation Partnership Project, "3rd Generation Partnership Project; Technical Specification Group Radio Access Network; Evolved Universal Terrestrial Radio Access (E-UTRA); Multiplexing and Channel Coding (Release 14)", Technical Specification, 3GPP TS 36.212 V14.0.0, Sep. 1, 2016, pp. 1-148, 3GPP.

Ericsson, "SPS Operation on sTTI", 3GPP TSG-RAN WG2 #96, Nevada, USA, Nov. 14, 2016, pp. 1-3, Tdoc R2-168627, 3GPP.

3rd Generation Partnership Project, "3rd Generation Partnership Project; Technical Specification Group Radio Access Network; Evolved Universal Terrestrial Radio Access (E-UTRA); Medium Access Control (MAC) protocol specification (Release 13)", Technical Specification, 3GPP TS 36.321 V13.2.0, Jun. 1, 2016, pp. 1-91, 3GPP, France.

* cited by examiner

SEMI-PERSISTENT SCHEDULING IN SUB-SUBFRAME OPERATION

RELATED APPLICATIONS

This application is a continuation of prior U.S. application Ser. No. 16/346,605, filed 1 May 2019, which was the National Stage of International Application PCT/EP2017/078102 filed 2 Nov. 2017, which claims the benefit of U.S. Provisional Application No. 62/417,737, filed 4 Nov. 2016, the entire disclosure of each being hereby incorporated by reference herein.

TECHNICAL FIELD

Embodiments of the present disclosure generally relate to scheduling radio transmissions and more particularly relate to semi-persistent scheduling of data transmissions to make use of transmission resources according to a pattern applied to multiple sub-subframes.

BACKGROUND

Many wireless communication systems involve transmission scheduling between wireless nodes. In some such systems, a first node sets the transmission schedule, and other nodes communicating with the first node adhere to the transmission schedule. One example of such a transmission schedule defines when the other nodes may expect the first node to transmit on a downlink. Another example of such a transmission schedule defines when the other nodes are permitted to transmit on an uplink. The first node may inform the other nodes of the transmission scheduling using Downlink Control Information (DCI). One particular example of such DCI may be DCI as defined by the 3GPP standards organization, e.g., according to 3GPP TS 36.212 V14.0.0 (2016-09). Such DCI may include, for example, a resource allocation, modulation and coding scheme, and other information useful for decoding transmissions. Other examples of such DCI may be particular proprietary to the particular wireless technology used for the communication, or may be defined by other standards organizations. By scheduling transmissions, the first node may coordinate communication between the nodes over a shared wireless medium (e.g., a particular time and/or frequency domain of an air interface).

SUMMARY

Some embodiments herein include a scheduling node that transmits, to a radio node configured for sub-subframe operation, a semi-persistent scheduling (SPS) configuration message configuring the radio node for sub-subframe-based SPS. The SPS configuration message comprises an identifier of the radio node and indicates a pattern of sub-subframes in which a resource allocation for the radio node repeats. In particular examples, the SPS configuration message configures the radio node for sub-subframe-based SPS that is concurrent with subframe-based SPS in which a subframe-based resource allocation repeats according to a further pattern.

Consistent with the above, embodiments herein include a method of transmission scheduling implemented by a scheduling node. The method comprises transmitting, to a radio node configured for sub-subframe operation, an SPS configuration message configuring the radio node for sub-subframe-based SPS. The SPS configuration message comprises an identifier of the radio node and indicates a pattern of sub-subframes in which a resource allocation for the radio node repeats.

In some embodiments, configuring the radio node for sub-subframe-based SPS comprises configuring the radio node for sub-subframe-based SPS that is concurrent with subframe-based SPS in which a subframe-based resource allocation repeats according to a further pattern.

In some embodiments, the SPS configuration instructs the radio node to prioritize either the resource allocation or a subframe-based resource allocation of the radio node with respect to any overlap between the resource allocations.

In some embodiments, the SPS configuration message further comprises a period indicating the pattern of sub-subframes in which the resource allocation repeats.

In some embodiments, the method further comprises determining a Hybrid Automatic Repeat Request (HARQ) process identifier corresponding to a data transmission on a particular sub-subframe, wherein determining the HARQ process identifier is based on a position of the particular sub-subframe within a comprising subframe. In some such embodiments, determining the HARQ process identifier based on the position of the particular sub-subframe within the comprising subframe comprises determining the HARQ process identifier according to:

HARQ Process ID=[floor(CURRENT_TTI/
   (semiPersistSchedIntervalUL*SSFs))]modulo
   numberOfConfUISPS-Processes;

CURRENT_TTI=[(SFN*10*SSFs)+
   (sub_num*SSFs)+ssf_pos];

semiPersistSchedIntervalUL is a subframe-based SPS period;
SSFs is a number sub-subframes within the subframe;
numberOfConfUISPS-Processes is a total number of HARQ process identifiers configured;
SFN is a system frame number;
sub_num is an index of the subframe within a larger frame structure; and
ssf_pos is an index of the particular sub-subframe within the subframe.

In some embodiments, the method further comprises transmitting HARQ feedback to the radio node on a subframe Physical Downlink Control Channel (PDCCH), wherein the feedback is addressed to the identifier of the radio node and further comprises a New Data Indicator set to one.

In some embodiments, the method further comprises transmitting, to the radio node, an SPS activation message instructing the radio node to activate SPS for sub-subframe-based SPS according to the SPS configuration message, the SPS activation message comprising the resource allocation addressed to the identifier of the radio node. In some such embodiments, the SPS activation message further instructs the radio node to transmit acknowledgement of the SPS activation message in a starting or subsequent sub-subframe in which SPS is activated, and the method further comprises receiving the acknowledgement of the SPS activation message in a Medium Access Control (MAC) control element according to the SPS activation message. In some such embodiments, receiving the acknowledgement of the SPS activation message comprises receiving the MAC control element via a subframe Physical Uplink Shared Channel (PUSCH).

Other embodiments include a method of transmission scheduling implemented by a radio node. The method comprises receiving, from a scheduling node, an SPS configuration message comprising an identifier of the radio node and indicating a pattern of sub-subframes in which a resource allocation for the radio node repeats. The method further comprises configuring the radio node for sub-subframe-based SPS according to the SPS configuration message.

In some embodiments, configuring the radio node for sub-subframe-based SPS comprises configuring the radio node for sub-subframe based SPS that is concurrent with subframe-based SPS in which a subframe-based resource allocation repeats according to a further pattern.

In some embodiments, the SPS configuration instructs the radio node to prioritize either the resource allocation or a subframe-based resource allocation of the radio node with respect to any overlap between the resource allocations.

In some embodiments, the SPS configuration message further comprises a period indicating the pattern of sub-subframes in which the resource allocation repeats.

In some embodiments, the method further comprises determining a Hybrid Automatic Repeat Request (HARQ) process identifier corresponding to a data transmission on a particular sub-subframe, wherein determining the HARQ process identifier is based on a position of the particular sub-subframe within a comprising subframe. In some such embodiments, determining the HARQ process identifier based on the position of the particular sub-subframe within the comprising subframe comprises determining the HARQ process identifier according to:

HARQ Process ID=[floor(CURRENT_TTI/
 (semiPersistSchedIntervalUL*SSFs))]modulo
 numberOfConfUlSPS-Processes;

CURRENT_TTI=[(SFN*10*SSFs)+
 (sub_num*SSFs)+ssf_pos];

semiPersistSchedIntervalUL is a subframe-based SPS period;
SSFs is a number sub-subframes within the subframe;
numberOfConfUlSPS-Processes is a total number of HARQ process identifiers configured;
SFN is a system frame number;
sub_num is an index of the subframe within a larger frame structure; and
ssf_pos is an index of the particular sub-subframe within the subframe.

In some embodiments, the method further comprises receiving HARQ feedback from the scheduling node on a subframe Physical Downlink Control Channel (PDCCH), wherein the feedback is addressed to the identifier of the radio node and further comprises a New Data Indicator set to one.

In some embodiments, the method further comprises receiving, from the scheduling node, an SPS activation message instructing the radio node to activate SPS for the sub-subframe-based SPS according to the SPS configuration message. The SPS activation message comprises the resource allocation addressed to the identifier of the radio node. The method further comprises decoding transmissions received from the scheduling node according to the resource allocation and the pattern. In some such embodiments, the SPS activation message further instructs the radio node to transmit acknowledgement of the SPS activation message in a starting or subsequent sub-subframe in which SPS is activated, and the method further comprises transmitting the acknowledgement of the SPS activation message in a Medium Access Control (MAC) control element according to the SPS activation message. In some such embodiments, transmitting the acknowledgement of the SPS activation message comprises transmitting the MAC control element via a subframe Physical Uplink Shared Channel (PUSCH).

Embodiments also include apparatus, systems, computer program products, software, and/or carriers that correspond to one or more of the methods described herein.

For example, embodiments include a scheduling node configured to transmit, to a radio node configured for sub-subframe operation, a semi-persistent scheduling (SPS) configuration message configuring the radio node for sub-subframe-based SPS. The SPS configuration message comprises an identifier of the radio node and indicates a pattern of sub-subframes in which a resource allocation for the radio node repeats.

Embodiments further include a radio node configured to receive, from a scheduling node, a semi-persistent scheduling (SPS) configuration message comprising an identifier of the radio node and indicating a pattern of sub-subframes in which a resource allocation for the radio node repeats. The radio node is also configured to configure the radio node for sub-subframe-based SPS according to the SPS configuration message.

Figure 1:
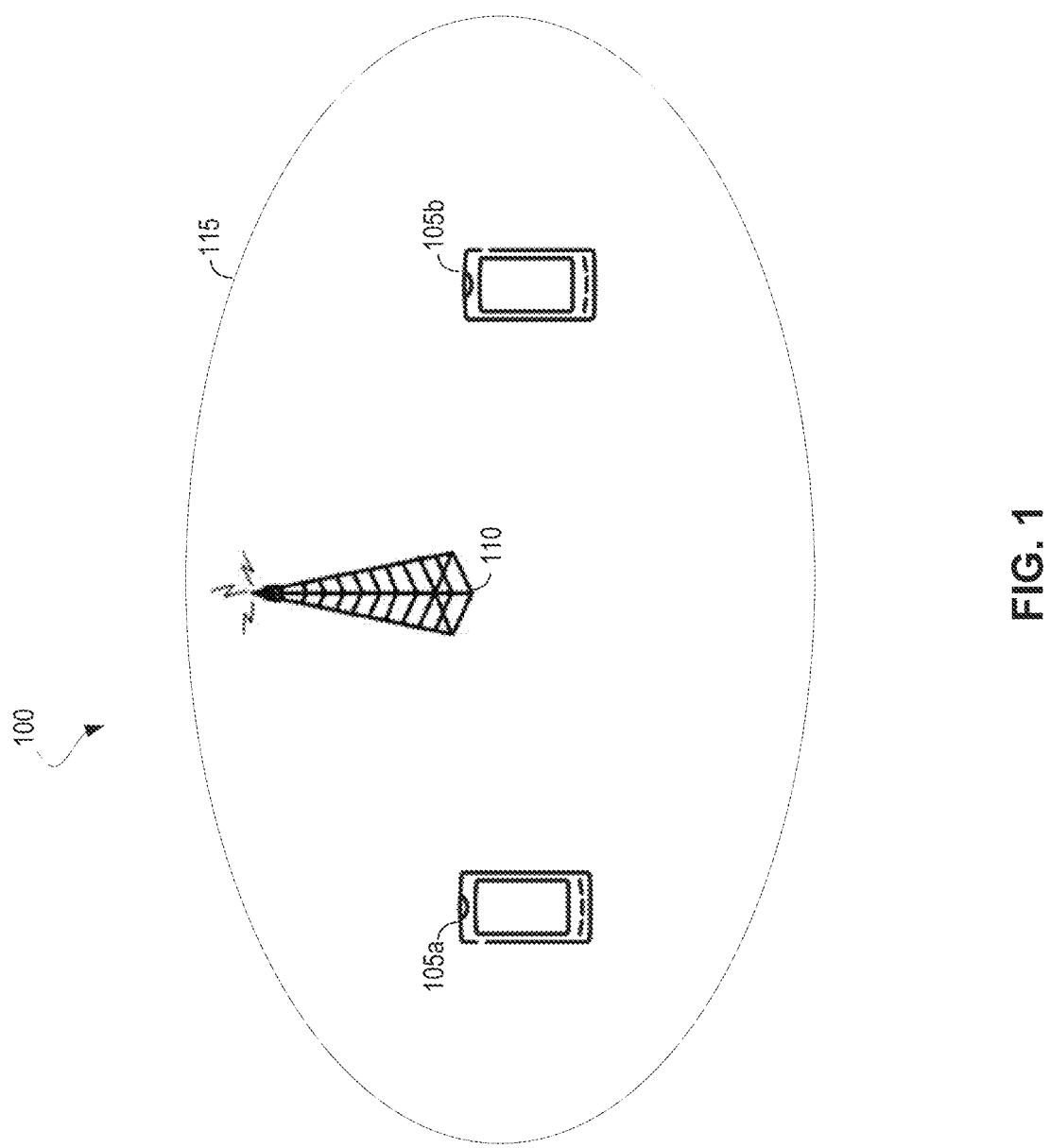
FIG. 1 illustrates an example wireless communication system, according to one or more embodiments of the present disclosure.

Note that, as used herein, when a reference numeral comprises a letter designation in the drawings, discussion of a specific instance of an illustrated element will use the appropriate corresponding letter designation (e.g., radio node 105a). However, the letter designation will be omitted in order to refer generically to the illustrated subject matter (e.g., discussion of a radio node 105 (generally), rather than discussion of particular radio nodes 105a, 105b).

DETAILED DESCRIPTION

As will be described in detail below, aspects of the present disclosure may be implemented entirely as hardware units, entirely as software modules (including firmware, resident software, micro-code, etc.), or as a combination of hardware units and software modules. For example, embodiments of the present disclosure may take the form of a non-transitory computer readable medium storing software instructions in the form of a computer program that, when executed on a programmable device, configures the programmable device to execute the various methods described below.

For clarity in understanding the disclosure below, to the extent that "one of" a conjunctive list of items (e.g., "one of A and B") is discussed, the present disclosure refers to one (but not both) of the items in the list (e.g., an A or a B, but not both A and B). Such a phrase does not refer to one of each of the list items (e.g., one A and one B), nor does such a phrase refer to only one of a single item in the list (e.g., only one A, or only one B). Similarly, to the extent that "at least one of" a conjunctive list of items is discussed (and similarly for "one or more of" such a list), the present disclosure refers to any item in the list or any combination of the items in the list (e.g., an A only, a B only, or both an A and a B). Such a phrase does not refer to one or more of each of the items in the list (e.g., one or more of A, and one or more of B).

Turning now to the drawings, FIG. 1 illustrates an example communication system 100 according to one or more embodiments of the present disclosure. Although the communication system 100 will be described in the context of a Long-Term Evolution (LTE) communication network, the discussion throughout this disclosure may similarly be applied to other wireless communication systems and/or combinations thereof, including but not limited to 5G Next Radio (NR) and/or Wi-Fi.

The communication system 100 comprises a plurality of wireless communication nodes. One of the wireless communication nodes in particular is a scheduling node 110 that serves a cell 115 to radio nodes 105a-b. In the context of LTE, radio nodes 105a-b may each be referred to as a User Equipment (UE), whereas the scheduling node 110 may be a base station (such as an eNodeB), for example. Although only one scheduling node 110 and two radio nodes 105a-b are illustrated in FIG. 1, other examples of the communication system 100 may include any number of scheduling nodes 110, each of which may serve one or more cells 115 to any number of radio nodes 105. Further, although radio nodes 105a-b have been described in the context of UEs, the radio nodes 105 may themselves be base stations (e.g., femtocells, relay base stations), according to other embodiments. Further, scheduling node 110 is itself a type of radio node, in that the scheduling node 110 is a network node capable of radio communication.

Figure 2:
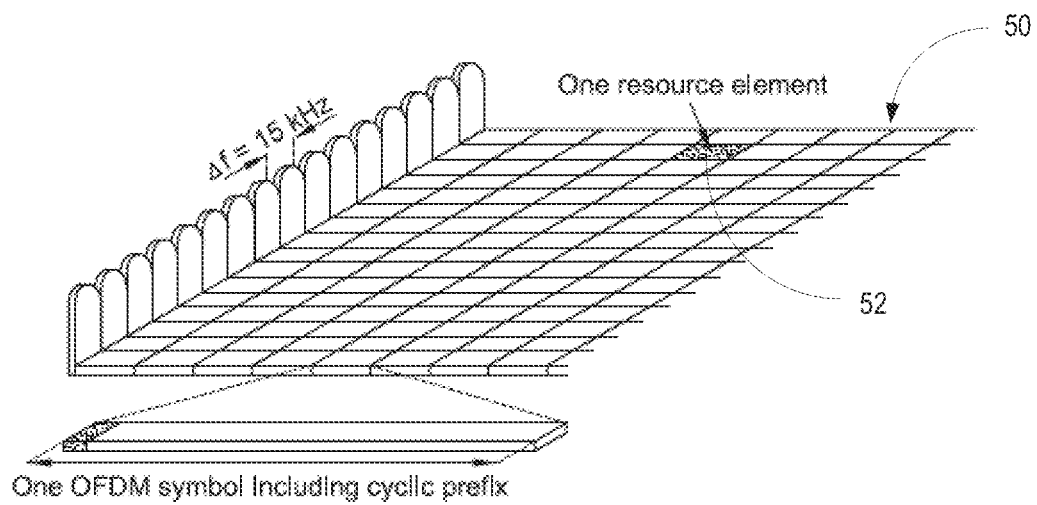
FIG. 2 illustrates an example of downlink physical resources as may be used for Orthogonal Frequency-Division Multiplexing (OFDM) communication, according to one or more embodiments of the present disclosure.

Wireless communication between the scheduling node 110 and each of the radio nodes 105a-b is performed using radio resources across a time and frequency domain. LTE in particular uses OFDM in the downlink and Discrete Fourier Transform (DFT) spread OFDM in the uplink. The basic LTE downlink physical resource can be viewed as a time-frequency grid. FIG. 2 illustrates a portion of an example OFDM time-frequency grid 50 for LTE. Generally speaking, the time-frequency grid 50 is divided into one millisecond subframes. Each subframe includes a number of OFDM symbols. For a normal cyclic prefix (CP) length, suitable for use in situations where multipath dispersion is not expected to be extremely severe, a subframe may comprise fourteen OFDM symbols. A subframe may comprise twelve OFDM symbols if an extended cyclic prefix is used. In the frequency domain, the physical resources shown in FIG. 2 are divided into adjacent subcarriers with a spacing of 15 kHz. The number of subcarriers may vary according to the allocated system bandwidth. The smallest element of the time-frequency grid 50 is typically referred to as a resource element, which comprises one OFDM subcarrier during one OFDM symbol interval.

Figure 3:
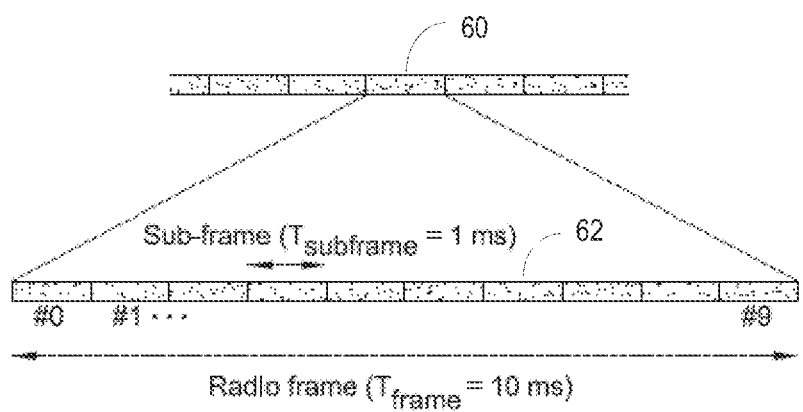
FIG. 3 illustrates an example time-domain structure as may be used for OFDM communication, according to one or more embodiments of the present disclosure.

In LTE systems, data is transmitted to the mobile terminals over a downlink transport channel known as the Physical Downlink Shared Channel (PDSCH). The PDSCH is a time and frequency multiplexed channel shared by a plurality of radio nodes 105. As shown in FIG. 3, the downlink transmissions are typically organized into ten millisecond radio frames 60. Each radio frame 60 typically comprises ten equally-sized subframes 62. For purposes of scheduling users to receive downlink transmissions, the downlink time-frequency resources are allocated in units called resource blocks (RBs). Each resource block typically spans twelve subcarriers (which may be adjacent or distributed across the frequency spectrum) and one 0.5 ms slot (one half of one subframe).

Figure 4:
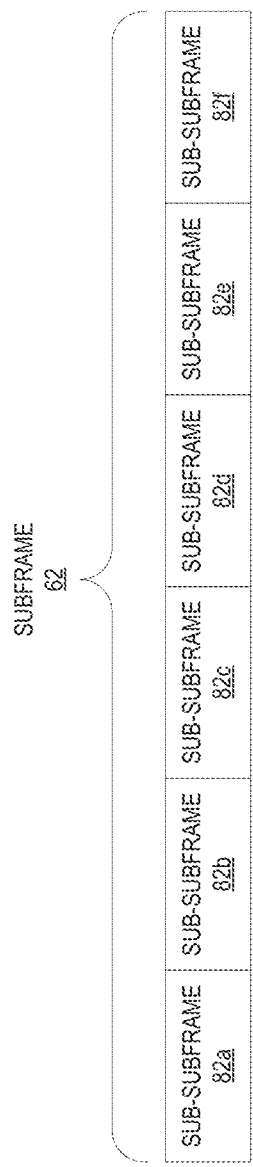
FIG. 4 illustrates an example time-domain structure in which sub-subframe operation is configured, according to one or more embodiments of the present disclosure.

A subframe 62 on either an uplink or a downlink between the scheduling node 110 and a radio node 105 may be further organized into sub-subframes 82, as illustrated in FIG. 4. In the example of FIG. 4, a subframe 62 comprises six sub-subframes 82a-f. Each sub-subframe 82a-f may be its own short transmission interval. In some embodiments, one or more of the sub-subframes 82a-f may be used for a control channel or a data channel. In particular, one or more of the sub-subframes 82a-f may comprise a short PDSCH (sPDSCH) or short Physical Uplink Shared Channel (sPUSCH), depending on whether the sub-subframe is part of the downlink or uplink respectively. In one particular example, sub-subframe 82a may be used for the PDCCH of subframe 62, and each of the sub-subframes 82b-f may comprise an sPDSCH. In some further embodiments, a sub-subframe 82 may comprise a short PDCCH (sPDCCH). Other combinations of uses and/or channels for the sub-subframes may be included in other embodiments.

Within a cell 115 the scheduling node 110 may dynamically schedule downlink transmissions to and/or uplink transmissions from one or more of the radio nodes 105a-b, according to one or more embodiments. For such dynamic scheduling, the scheduling node 110 may transmit downlink control information (DCI) in each subframe 62. The DCI identifies one or more radio nodes 105 that have been scheduled to receive data in the current downlink subframe 62 and the resource blocks on which the data is being transmitted to the scheduled radio nodes 105. The DCI is typically transmitted on the PDCCH or enhanced PDCCH (ePDCCH), e.g., in the first two, three, or four OFDM symbols in each subframe 62. The resources on which the data is carried is typically transmitted in a corresponding Physical Downlink Shared Channel (PDSCH).

Scheduling node 110 may additionally or alternatively perform semi-persistent scheduling (SPS) of the downlink and/or uplink, according to one or more embodiments. SPS generally requires less signaling overhead than dynamic scheduling. For SPS scheduling, the resource blocks on which data is being transmitted to one or more radio nodes 105 is not identified in DCI transmitted in each subframe 62 (as is the case in dynamic scheduling). Rather, the resource blocks may be identified in DCI transmitted in a particular subframe 62 for multiple subframes (e.g., the present subframe and one or more subsequent subframes). According to one or more embodiments, the multiple subframes may be contiguous or discontiguous. The spacing between subframe occasions to which the DCI applies may, in some embodiments, be a periodicity of the SPS. This SPS period may be expressed in terms of time (e.g., every 10 milliseconds) and/or in terms of subframes (e.g., every tenth subframe). According to embodiments, this period may be adapted by the scheduling node 110, e.g., by appropriate signaling as will be discussed below. Further, this period may be of a duration that is less than, equal to, or greater than the duration of a radio frame 60, according to various embodiments.

According to embodiments, the scheduling node 110 may freely switch between dynamic scheduling and SPS, and may configure one or more radio nodes 105 accordingly (e.g., via Radio Resource Control (RRC) signaling to indicate that SPS of a particular periodicity is to be used). Thereafter, a resource assignment may be sent in DCI to a radio node 105 to activate SPS. The radio node 110 may store this DCI and expect a downlink transmission at each SPS occasion accordingly.

According to embodiments of the present disclosure, SPS may be configured for sub-subframe-based SPS operation on the downlink and/or uplink. According to sub-subframe-based SPS, scheduled resource blocks (e.g., as identified in DCI transmitted in a particular subframe 62) are applied to multiple sub-subframes according to a pattern. The pattern of scheduled sub-subframes may further repeat according to a further subframe-based SPS pattern (e.g., periodically).

Figure 5:
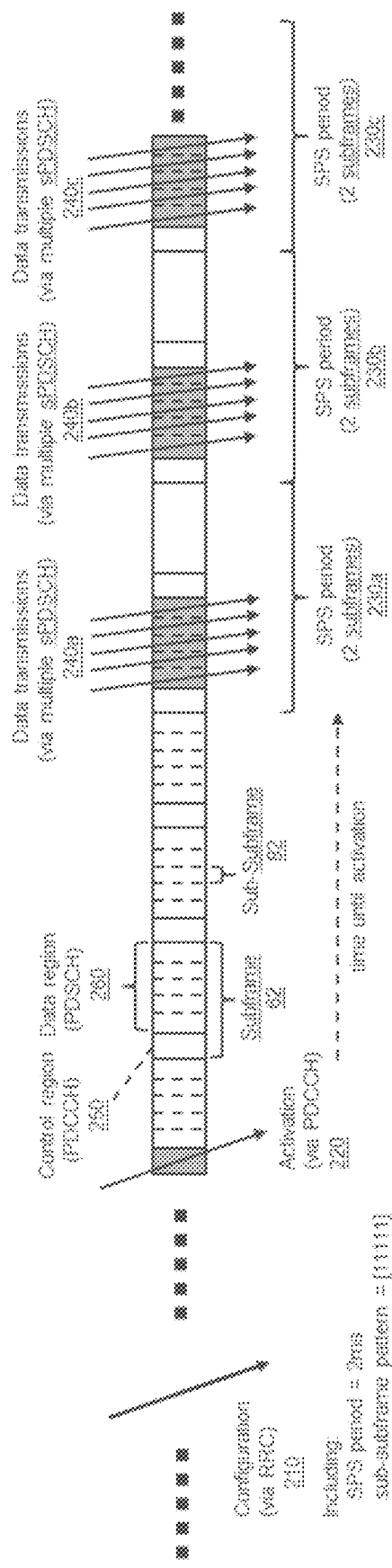
FIG. 5 illustrates an example time-domain of a downlink in which sub-subframe SPS is configured and activated, according to one or more embodiments of the present disclosure.

An example time-domain of a downlink configured for sub-subframe-based SPS operation is illustrated in the example of FIG. 5. The time-domain comprises a plurality of subframes 62, each of which comprises an initial control region 250 (i.e., a PDCCH) and a subsequent data region 260 (i.e., a PDSCH). In some embodiments, the scheduling may previously have been dynamic (not shown), such that DCI is transmitted in the control region 250 indicates resources of the corresponding data region 260 in which data will be transmitted by the scheduling node 110 to a radio node 105.

According to this example, the scheduling node 110 transmits a configuration message 210 via RRC signaling to configure the radio node 105 for sub-subframe-based SPS. The configuration message 210 indicates a periodicity of the SPS (in this example, two subframes). The configuration message 210 also indicates a pattern of sub-subframes in which a resource allocation for the radio node 105 repeats (in this example, a pattern of five consecutive sub-subframes, signaled in the configuration message 210 as a bitmap of 11111). The configuration message may also include an identifier of the radio node 105, such as a Radio Network Temporary Identifier (RNTI). Later, according to this example, the scheduling node 110 transmits an activation message 220 in the control region 250 of a subframe 62 to activate the sub-subframe-based SPS (i.e., as configured by the configuration message 210) at a future time. In this particular example, activation is preconfigured to occur in the fourth subframe 62 after the subframe 62 carrying the activation message 220. In some other examples, the time to activation may be configured by the configuration message 210 or by other signaling. This activation may, in some embodiments, switch the scheduling mode of the radio node 105, e.g., if the radio node 105 was previously configured for dynamic scheduling.

The activation message 220 includes the resource allocation on which data will be transmitted to the radio node 105 according to the sub-subframe pattern in the relevant sub-subframes 82. The scheduling node 110 then transmits data 240a in the data region 260 of the fourth subframe 62 after the subframe 62 carrying the activation message 220 (i.e., the first subframe 62 in the initial SPS period 230a) according to the sub-subframe pattern, and continues transmitting data 240b, 240c in every SPS period 230b, 230c thereafter according to the sub-subframe pattern (as configured by the configuration message 210). Accordingly, according to this example, once SPS is activated, the radio node 105 is configured to expect a possible data transmission from the scheduling node 110 in five consecutive sub-subframes 82 every two subframes 62.

Although activation is preconfigured to occur in the fourth subframe 62 after the activation message 220 in the example described above, according to other embodiments the activation message 220 may indicate a starting sub-subframe 82 in which to activate SPS. Embodiments may also, for example, instruct the radio node 105 to transmit acknowledgement of the activation message 220 in, e.g., the starting sub-subframe 82 or a sub-subframe 82 thereafter. This acknowledgement may be transmitted by the radio node 105 to the scheduling node 110 in a Medium Access Control (MAC) control element (e.g., via the PUSCH or sPUSCH) in the sub-subframe 82 indicated by the activation message 220.

Although some embodiments may use separate configuration and activation messages 210, 220 to configure and activate the radio node 105 for SPS, respectively, other embodiments may use a single message to both configure and activate SPS in the radio node. In an example of such an embodiment, the single message to configure and activate SPS may include DCI identifying the resources on which data will be transmitted, and a duration between instances of subframes carrying such resources (i.e., a periodicity of the SPS).

Further, the configuration and/or activation message 210, 220 may be transmitted using different channels and/or signaling according to other embodiments. For example, the configuration and/or activation message 210, 220 may be transmitted using a Medium Access Control (MAC) Control Element, e.g., in a PDSCH or sPDSCH transmission.

Further, although the example of FIG. 5 illustrates an SPS period 230 of two subframes, other embodiments include SPS periods 230 of other durations. For example, particular radio nodes 105 may have very low latency requirements. Such radio nodes 105 may be devices participating in Critical Machine Type Communication (CMTC), for example. Such a system may, for example, have an SPS period 230 of less than two subframes. Less critical systems may have an SPS period 230 of more than two subframes but less than 10 milliseconds (i.e., less than one typical LTE radio frame 60). Systems that involve very infrequent and/or low priority communication, for example, may have SPS periods 230 of more than ten subframes. The SPS period specified by the scheduling node 110 may be dependent upon the particular system, devices, and/or conditions that are present.

Further, although the example of FIG. 5 illustrates a sub-subframe pattern of five consecutive sub-subframes 82, other embodiments may include other patterns and may be represented by other data structures. For example, a pattern of alternating sub-subframes 82 may be indicated by a corresponding flag. Alternatively, a repeating pattern of periodic sub-subframes may be indicated by specifying a duration of the sub-subframe SPS period (e.g., in terms of time or sub-subframes). Other patterns may be randomly selected by the scheduling node 110, for example, and indicated using respective bitmaps. For example, the pattern of two allocated sub-subframes 82 followed by two non-allocated sub-subframes may be represented by the bitmap 1100, its decimal integer equivalent 12, or other data structure. In general, embodiments may include a plurality of the sub-subframes that fit within a duration of a single subframe, and the SPS configuration message 210 may indicate the pattern in which the resource allocation repeats by indicating to which of the plurality of the sub-subframes 82 the resource allocation applies.

Figure 6:
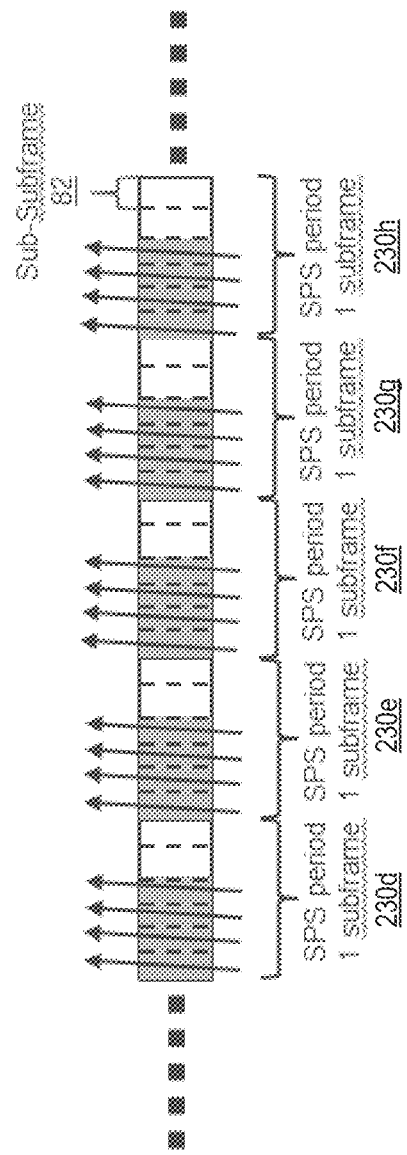
FIG. 6 illustrates an example time-domain of sub-subframe SPS operation on an uplink, according to one or more embodiments of the present disclosure.

Further, although the example of FIG. 5 illustrates an example of a downlink configured for sub-subframe-based SPS operation, the uplink may be similarly configured, as shown in the example of FIG. 6. To configure the sub-subframe-based SPS operation of FIG. 6, a configuration message 210 may include a pattern for the uplink in which a resource allocation for the radio node 105 repeats on the uplink. In the example of FIG. 6, the uplink pattern is three scheduled sub-subframes 82 followed by two unscheduled sub-subframes 82, which may be represented in the activation message 210 using a bitmap of 11100, for example. The configuration message 210 may also include an SPS periodicity for the uplink. In this example, the SPS periodicity of the uplink is one subframe 62. Accordingly, the example of FIG. 6 shows an uplink configured with multiple SPS periods 230d-h, each one subframe 62 in duration, in which data is transmitted by the radio node 105 on the uplink according to a pattern of three sub-subframes 82, and not transmitted in the following two sub-subframes 82 in each subframe 62.

In view of the example above, particular embodiments may include providing control information (e.g., activation, configuration, and/or release messages) to the radio node 105 via an sPDCCH of a sub-subframe and/or the PDCCH of a subframe 62. Such control messages may include DCI to provide resource allocation to the radio node 105 according to dynamic scheduling, subframe-based SPS, and/or sub-subframe-based SPS operation. Confirmation of this SPS may be transmitted by the radio node 105 using a MAC control element, e.g., in the first granted uplink resource after the SPS is activated. Any or all of the information comprised in any of these control messages may be addressed to the radio node 105 using an identifier of the radio node 105 (e.g., a Radio Network Temporary Identifer (RNTI)).

In some embodiments, such control information may configure the radio node 105 for sub-subframe based SPS that is concurrent with subframe-based SPS. Some such embodiments may include a sub-subframe resource allocation for the sub-subframe-based SPS, and a subframe resource allocation for the concurrent subframe-based SPS. In some such embodiments, the resource allocations may overlap with respect to particular resources. Thus, in some such embodiments, the configuration message 210 may instruct the radio node 105 to prioritize either the sub-subframe resource allocation or the subframe-based resource allocation with respect to any such overlap.

Further, in some such embodiments in which sub-sub-frame-based and subframe-based SPS is to operate concurrently, the patterns between the two may be jointly configurable and/or discerned from one another due to a relationship between their transmission patterns. For example, the scheduling node 110 may transmit a configuration message 210 to the radio node 105 that indicates a subframe-based SPS period of two subframes 62, and that sub-subframe-based SPS should also be used, i.e., without explicitly stating what sub-subframe-based SPS pattern the radio node 105 is to use. In some such embodiments, the radio node 105 determines the sub-subframe-based SPS pattern based on the subframe-based SPS pattern. For example, if the subframe-based SPS is configured to use an SPS period 230 of two subframes, the radio node 105 may determine that the pattern for sub-subframe-based SPS should similarly use a periodic two sub-subframe 82 interval. Similarly, the scheduling node 110 may configure the pattern of sub-subframes according to subframe-based SPS period. Other relationships between subframe-based and sub-subframe-based SPS are also included in other embodiments.

As discussed above, the scheduling node 110 may be serving multiple radio nodes 105. In particular, the scheduling node 110 may grant resource allocations to each of the radio nodes 105a-b. In some such cases, the scheduling node 110 may coordinate the resource allocations of different radio nodes 105a-b to prevent or limit overlap. In some embodiments, the scheduling node 110 randomly selects the plurality of the sub-subframes to which the resource allocation applies for each of the resource allocations. While this random selection may not completely eliminate overlap (in some embodiments), such random selection may reduce the likelihood of overlap while being computationally efficient (e.g., such an approach may avoid the need for complex algorithms to locate unallocated resources and signal an appropriate pattern to the radio nodes 105a-b).

The scheduling node 110 may take further measures to resolve overlapping resource assignments in one or more embodiments in which such overlaps may occur. For example, in some embodiments, the scheduling node 110 may scramble each of a plurality of sPDSCH transmissions with the identifier of the radio node (e.g., RNTI) to which the sPDSCH transmission is intended. Thus, the scheduling node 110 may scramble an sPDSCH transmission intended for radio node 105a with an RNTI of that radio node 105, for example. Other embodiments may resolve overlapping resource allocation by scrambling the cyclic redundancy check (CRC) code corresponding to the sPDSCH transmission, e.g., using the identifier of the radio node 105 to which the sPDSCH transmission is intended. Thus, the scheduling node 110 may scramble a CRC corresponding to a further sPDSCH transmission intended for radio node 105b with an RNTI of that radio node 105, and transmit the scrambled CRC. In such embodiments, a radio node 105 may, e.g., descramble the scrambled data received and attempt to perform a CRC check. If the CRC check is successful, the sPDSCH transmission may be considered to be directed to that radio node 105. If not, the sPDSCH transmission may be erroneous or intended for a different radio node 105.

Some embodiments use Hybrid Automatic Repeat Request (HARQ) on the uplink and/or downlink. During dynamic scheduling, a HARQ process identifier is typically specified in the control region 250 of each subframe 62 for use with data transmission and/or HARQ feedback. However, such information may not be in each subframe under SPS operation. Accordingly, in some embodiments, the radio node 105 and/or scheduling node 110 may determine a HARQ process identifier on their own. In particular, in some embodiments, the radio node 105 and scheduling node 110 each determine a HARQ process identifier for data transmission in a consistent manner, such that each can independently determine the HARQ process identifier without having to signal this information. For example, the radio node 105 and/or scheduling node 110 may use a formula to derive the HARQ process identifier from, e.g., a system frame number, subframe number, and/or other parameters known to both the radio node 105 and scheduling node 110. As one particular example, the HARQ process identifier may be determined according to the formula:

HARQ Process ID=[floor(CURRENT_TTI/ (semiPersistSchedIntervalUL*SSFs))]modulo numberOfConfUISPS-Processes In this example formula CURRENT_TTI is given by the formula:

CURRENT_TTI=[(SFN*10*SSFs)+ (sub_num*SSFs)+ssf_pos]

In the formulas above, semiPersistSchedIntervalUL may be a subframe-based SPS period; SSFs may be a number sub-subframes within the subframe; numberOfConfUISPS-Processes may be a total number of HARQ process identifiers configured; SFN may be a system frame number; sub_num may be an index of the subframe within a larger frame structure; and ssf_pos may be an index of the particular sub-subframe within the subframe. Other formula may additionally or alternatively be used.

Consistent with the above, HARQ feedback may be transmitted by the scheduling node 110 to a radio node 105 on the sPDCCH or PDCCH, according to embodiments. In particular embodiments, the feedback comprises a bitmap of previous sub-subframes 82 of the sub-subframe-based SPS, each bit of the bitmap indicating whether or not retransmission of a previous transmission on the corresponding sub-subframe 82 is requested from the radio node 105. Such feedback may, for example, be addressed to the identifier of the radio node and may further comprise a New Data Indicator set to one, e.g., to indicate that a retransmission is requested. The HARQ scheme used may, for example, use the sPDCCH to schedule such retransmissions. As this sPDCCH may be an in-band control channel, the location of the sPDCCH may be included in the configuration message 210, according to embodiments.

Figure 7:
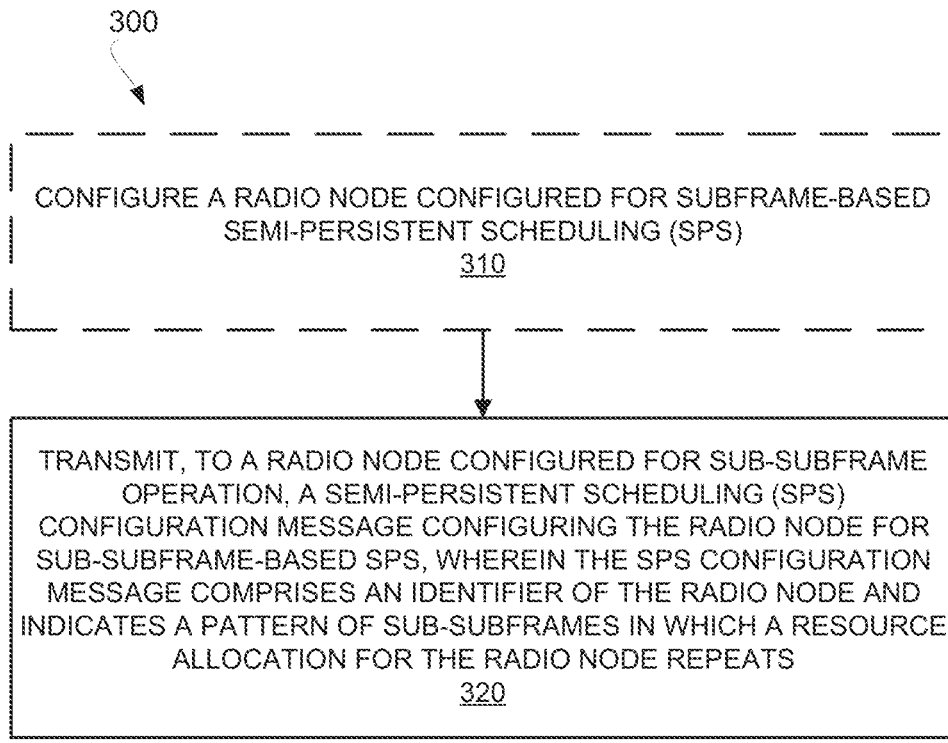
FIG. 7 illustrates an example method implemented by a scheduling node, according to one or more embodiments of the present disclosure.

In view of the above, embodiments of the present disclosure include the example method 300 of transmission scheduling illustrated in FIG. 7. The method 300 may be implemented by a scheduling node 110 and comprises transmitting, to a radio node 105 configured for sub-subframe operation, an SPS configuration message 210 configuring the radio node 105 for sub-subframe-based SPS (block 320). The SPS configuration message 210 comprises an identifier of the radio node 105 and indicates a pattern of sub-subframes 82 in which a resource allocation for the radio node 105 repeats. According to some embodiments of such an example method 300, the method 300 may further comprise configuring the radio node 105 for subframe-based SPS (block 310), and transmitting the SPS configuration message 210 configuring the radio node 105 for sub-subframe-based SPS in response (block 320).

Figure 8:
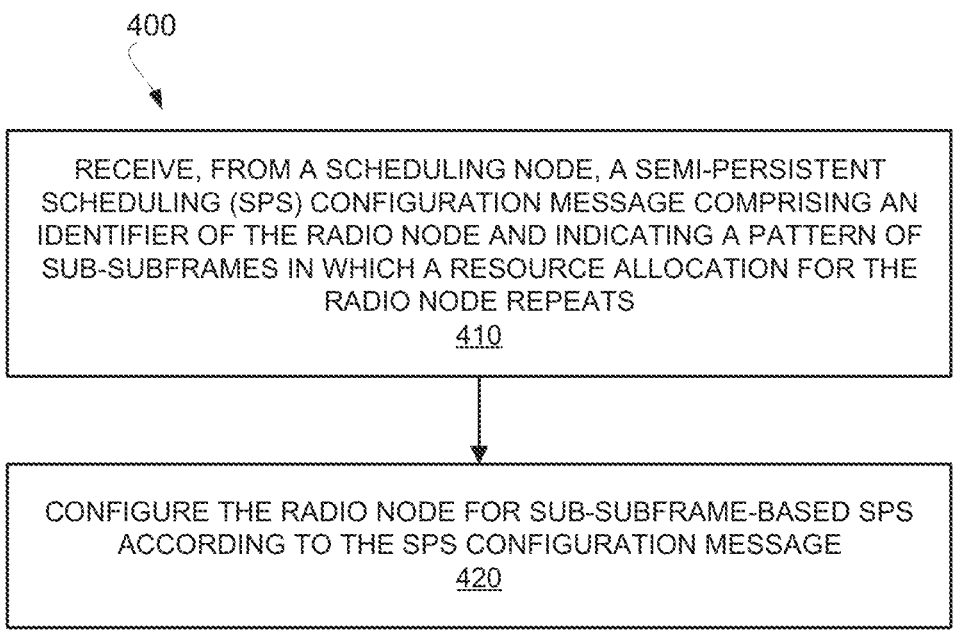
FIG. 8 illustrates an example method implemented by a radio node, according to one or more embodiments of the present disclosure.

Other embodiments of the present disclosure include the example method 400 of transmission scheduling illustrated in FIG. 8. The method 400 may be implemented by a radio node 105 and comprises receiving, from a scheduling node 110, an SPS configuration message 210 comprising an identifier of the radio node 105 and indicating a pattern of sub-subframes 82 in which a resource allocation for the radio node 105 repeats (block 410). The method 400 further comprises configuring the radio node 105 for sub-subframe-based SPS according to the SPS configuration message 210 (block 420).

Note that a scheduling node 110 and/or radio node 105 as described above may perform any of the methods described herein (and any other processing herein) by implementing any functional means, units, or modules. In one embodiment, for example, the scheduling node 110 comprises respective circuits or circuitry configured to perform the steps of method 300 shown in FIG. 7. In another embodiment, for example, the radio node 105 comprises respective circuits or circuitry configured to perform the steps of method 400 shown in FIG. 8. The circuits or circuitry in this regard may comprise circuits dedicated to performing certain functional processing and/or may comprise one or more microprocessors in conjunction with memory. In embodiments that employ memory, which may comprise one or several types of memory such as read-only memory (ROM), random-access memory, cache memory, flash memory devices, optical storage devices, etc., the memory may store program code that, when executed by the one or more processors, carries out the techniques described herein.

Figure 9:
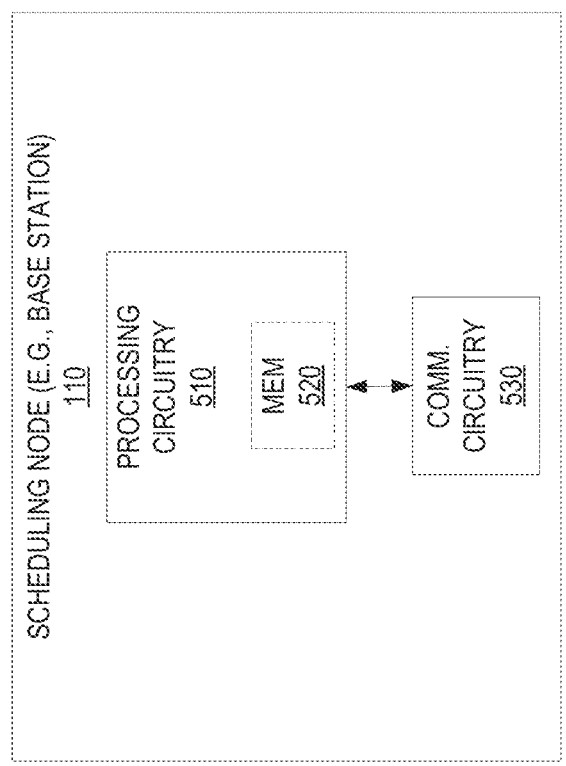
FIG. 9 is a block diagram illustrating example hardware of a scheduling node useful for implementing one or more of the methods described herein, according to one or more embodiments of the present disclosure.

FIG. 9 illustrates an example scheduling node 110, implemented in accordance with one or more embodiments. As shown, the scheduling node 110 includes processing circuitry 510 and communication circuitry 530. The communication circuitry 530 is configured to transmit and/or receive information to and/or from one or more other nodes, e.g., via any communication technology. Such communication may occur via one or more antennas that are either internal or external to the scheduling node 110. The processing circuitry 510 is configured to perform processing described above, e.g., in FIG. 7, such as by executing instructions stored in memory 520. The processing circuitry 510 in this regard may implement certain functional means, units, or modules.

Figure 10:
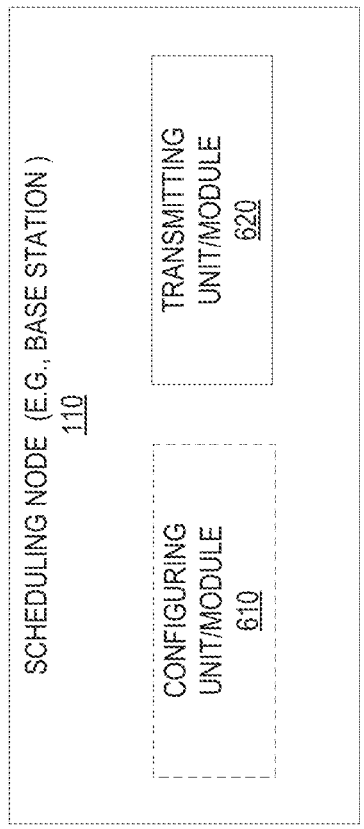
FIG. 10 is a block diagram illustrating example means, physical units, or software modules of a scheduling node useful for implementing one or more of the methods described herein, according to one or more embodiments of the present disclosure.

FIG. 10 illustrates an example scheduling node 110, implemented in accordance with one or more other embodiments. As shown, the scheduling node 110 implements various functional means, units, or modules, e.g., via the processing circuitry 510 in FIG. 9 and/or via software code. These functional means, units, or modules, e.g., for implementing the method 300 in FIG. 7, include for instance a configuring unit or module 610 for configuring a radio node configured for subframe-based SPS, in some embodiments. Additionally or alternatively included is a transmitting unit or module 620 for transmitting, to a radio node 105 configured for sub-subframe operation, an SPS configuration message 210 configuring the radio node 105 for sub-subframe-based SPS. The SPS configuration message 210 comprises an identifier of the radio node 105 and indicates a pattern of sub-subframes 82 in which a resource allocation for the radio node 105 repeats.

Figure 11:
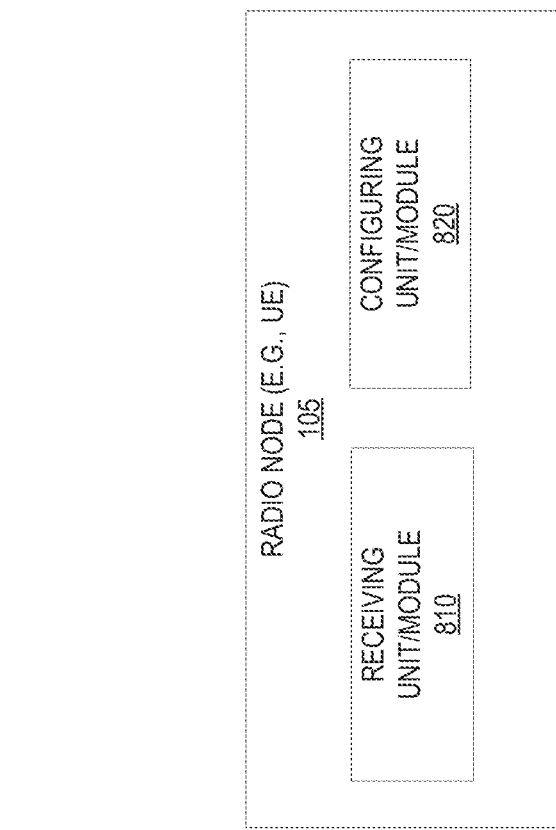
FIG. 11 is a block diagram illustrating example hardware of a radio node useful for implementing one or more of the methods described herein, according to one or more embodiments of the present disclosure.

FIG. 11 illustrates an example radio node 105, implemented in accordance with one or more embodiments. As shown, the radio node 105 includes processing circuitry 710 and communication circuitry 730. The communication circuitry 730 is configured to transmit and/or receive information to and/or from one or more other nodes, e.g., via any communication technology. Such communication may occur via one or more antennas that are either internal or external to the radio node 105. The processing circuitry 710 is configured to perform processing described above, e.g., in FIG. 8, such as by executing instructions stored in memory 720. The processing circuitry 710 in this regard may implement certain functional means, units, or modules.

Figure 12:
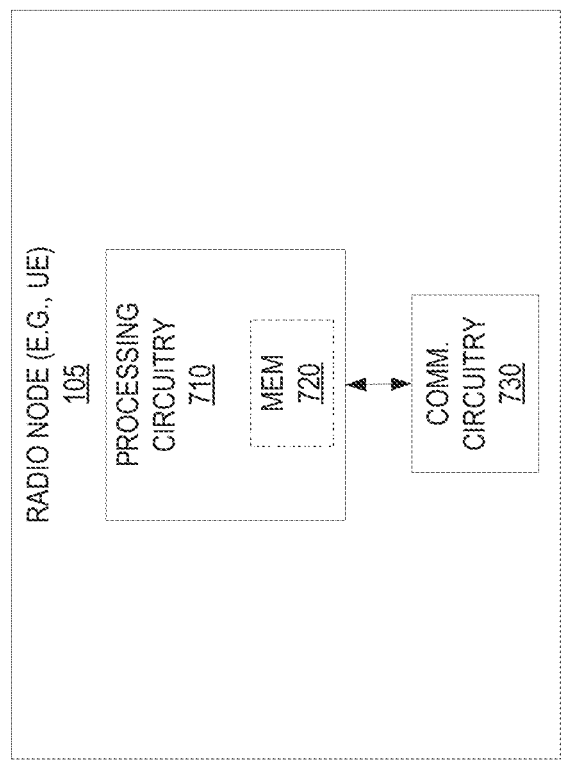
FIG. 12 is a block diagram illustrating example means, physical units, or software modules of a radio node useful for implementing one or more of the methods described herein, according to one or more embodiments of the present disclosure.

FIG. 12 illustrates an example radio node 105, implemented in accordance with one or more other embodiments. As shown, the radio node 105 implements various functional means, units, or modules, e.g., via the processing circuitry 710 in FIG. 11 and/or via software code. These functional means, units, or modules, e.g., for implementing the method 400 in FIG. 8, include for instance a receiving unit or module 810 for receiving, from a scheduling node 110, an SPS configuration message 210 comprising an identifier of the radio node 105 and indicating a pattern of sub-subframes 82 in which a resource allocation for the radio node 105 repeats. Also included is a configuring unit or module 820 for configuring the radio node 105 for sub-subframe-based SPS according to the SPS configuration message 210.

Those skilled in the art will also appreciate that embodiments herein further include methods and devices that initiate any of the methods described above, e.g., via one or more corresponding control commands issued over an appropriate signaling medium.

Those skilled in the art will also appreciate that embodiments herein further include corresponding computer programs.

Embodiments further include a computer program that comprises instructions which, when executed on at least one processor of a scheduling node 110 or radio node 105, cause the scheduling node 110 or radio node 105 to carry out any of the respective processing described above. A computer program in this regard may comprise one or more code modules corresponding to the means or units described above.

Embodiments further include a carrier containing such a computer program. This carrier may comprise one of an electronic signal, optical signal, radio signal, or computer readable storage medium.

In this regard, embodiments herein also include a computer program product stored on a non-transitory computer readable (storage or recording) medium and comprising instructions that, when executed by a processor of a scheduling node 110 or radio node 105, cause the scheduling node 110 or radio node 105 to perform as described above.

Embodiments further include a computer program product comprising program code portions for performing the steps of any of the embodiments herein when the computer program product is executed by a scheduling node 110 or radio node 105. This computer program product may be stored on a computer readable recording medium.

The present disclosure may be carried out in other ways than those specifically set forth herein without departing from the essential characteristics thereof. For example, additional physical units or software modules may be included in the various embodiments to perform any of the additional functions discussed above. The present embodiments are to be considered in all respects as illustrative and not restrictive, and all changes coming within the meaning and equivalency range of the appended claims are intended to be embraced therein.

What is claimed is:

1. A scheduling node comprising:
   communication circuitry configured to exchange signals with a radio node;
   processing circuitry communicatively connected to the communication circuitry, wherein the processing circuitry is configured to configure the radio node for sub-subframe-based semi-persistent scheduling (SPS);
   wherein to configure the radio node for the sub-subframe-based SPS, the processing circuitry is configured to transmit, to the radio node via the communication circuitry, an SPS configuration message that indicates a pattern of sub-subframes in which a resource allocation for the radio node repeats.

2. The scheduling node of claim 1, wherein the processing circuitry is further configured to configure the pattern of sub-subframes in which the resource allocation repeats according to a number of sub-subframes equal to a number of subframes in which a subframe-based resource allocation repeats.

3. The scheduling node of claim 1, wherein a plurality of the sub-subframes fit within a duration of a single subframe, and the SPS configuration message indicates the pattern in which the resource allocation repeats by indicating to which of the plurality of the sub-subframes the resource allocation applies.

4. The scheduling node of claim 3, wherein the processing circuitry is further configured to randomly select the plurality of the sub-subframes to which the resource allocation applies.

5. The scheduling node of claim 1, wherein the processing circuitry is further configured to transmit Hybrid Automatic Repeat Request (HARQ) feedback to the radio node on a sub-subframe short Physical Downlink Control Channel (sPDCCH).

6. The scheduling node of claim 1, wherein the processing circuitry is further configured to receive a bitmap representing previous sub-subframes of the sub-subframe-based SPS, each bit of the bitmap indicating whether or not retransmission of a previous transmission on a corresponding sub-subframe is requested from the radio node.

7. The scheduling node of claim 1, wherein the processing circuitry is further configured to transmit, to the radio node via a sub-subframe sPDCCH, an SPS activation message instructing the radio node to activate SPS for sub-subframe-based SPS according to the SPS configuration message, wherein the SPS activation message comprises the resource allocation.

8. The scheduling node of claim 7, wherein the SPS activation message further instructs the radio node to transmit acknowledgement of the SPS activation message in a starting sub-subframe of the SPS.

9. The scheduling node of claim 7, wherein the SPS activation message further instructs the radio node to transmit acknowledgement of the SPS activation message in one of the sub-subframes after a starting sub-subframe of the SPS.

10. The scheduling node of claim 1, wherein the processing circuitry is further configured to scramble each of a plurality of sPDSCH transmissions comprising the resource allocation with an identifier of the radio node or an identifier of a different radio node based on whether the sPDSCH transmission is intended for the radio node or the different radio node, respectively.

11. The scheduling node of claim 1, wherein the processing circuitry is further configured to scramble each of a plurality of cyclic redundancy check (CRC) codes corresponding to respective sPDSCH transmissions comprising the resource allocation with an identifier of the radio node or an identifier of a different radio node based on whether the sPDSCH transmission corresponding to the CRC code is intended for the radio node or the different radio node, respectively.

12. A method, implemented by a scheduling node of a wireless communication network, the method comprising:
- configuring a radio node for sub-subframe-based semi-persistent scheduling (SPS);
- wherein the configuring comprises transmitting, to the radio node, an SPS configuration message that indicates a pattern of sub-subframes in which a resource allocation for the radio node repeats.

13. A radio node comprising:
- communication circuitry configured to exchange signals with a scheduling node;
- processing circuitry communicatively coupled to the communication circuitry, wherein the processing circuitry is configured to:
  - receive a semi-persistent scheduling (SPS) configuration message from the scheduling node via the communication circuitry, the SPS configuration message indicating a pattern of sub-subframes in which a resource allocation for the radio node repeats; and
  - configure the radio node for sub-subframe-based SPS according to the SPS configuration message.

14. The radio node of claim 13, wherein the processing circuitry is further configured to determine that the pattern of sub-subframes in which the resource allocation for the radio node repeats is according to a number of sub-subframes equal to a number of subframes in which a subframe-based resource allocation repeats responsive to a period field of the SPS configuration message being unspecified.

15. The radio node of claim 13, wherein a plurality of the sub-subframes fit within a duration of a single subframe, and the SPS configuration message indicates the pattern in which the resource allocation repeats by indicating to which of the plurality of sub-subframes the resource allocation applies.

16. The radio node of claim 13, wherein the processing circuitry is further configured to receive Hybrid Automatic Repeat Request (HARQ) feedback from the scheduling node via the communication circuitry on a sub-subframe short Physical Downlink Control Channel (sPDCCH).

17. The radio node of claim 13, wherein the processing circuitry is further configured to receive a bitmap representing previous sub-subframes of the sub-subframe-based SPS, each bit of the bitmap indicating whether or not retransmission of a previous transmission from the radio node to the scheduling node on a corresponding sub-subframe is requested.

18. The radio node of claim 13, wherein the processing circuitry is further configured to receive an SPS activation message via the communication circuitry on a sub-subframe sPDCCH, wherein the SPS activation message instructs the radio node to activate SPS for sub-subframe-based SPS according to the SPS configuration message and comprises the resource allocation.

19. The radio node of claim 18, wherein the SPS activation message further instructs the radio node to transmit acknowledgement of the SPS activation message in a starting sub-subframe.

20. The radio node of claim 18, wherein the SPS activation message further instructs the radio node to transmit acknowledgement of the SPS activation message in a sub-subframe after a starting sub-subframe.

21. The radio node of claim 13, wherein the processing circuitry is further configured to:
- receive a sub-subframe sPDSCH transmission scrambled with an identifier of the radio node; and
- descramble the sub-subframe sPDSCH transmission using the identifier of the radio node.

22. The radio node of claim 13, wherein the processing circuitry is further configured to:
- receive a cyclic redundancy check (CRC) code corresponding to a sPDSCH transmission, the CRC code being scrambled with an identifier of the radio node;
- descramble the CRC code using the identifier of the radio node;
- decode the sPDSCH transmission using the descrambled CRC code.

23. A method, implemented in a radio node of a wireless communication network, the method comprising:
- receiving a semi-persistent scheduling (SPS) configuration message from a scheduling node, the SPS configuration message indicating a pattern of sub-subframes in which a resource allocation for the radio node repeats; and
- configuring the radio node for sub-subframe-based SPS according to the SPS configuration message.

* * * * *